United States Patent Office 3,396,719
Patented Aug. 13, 1968

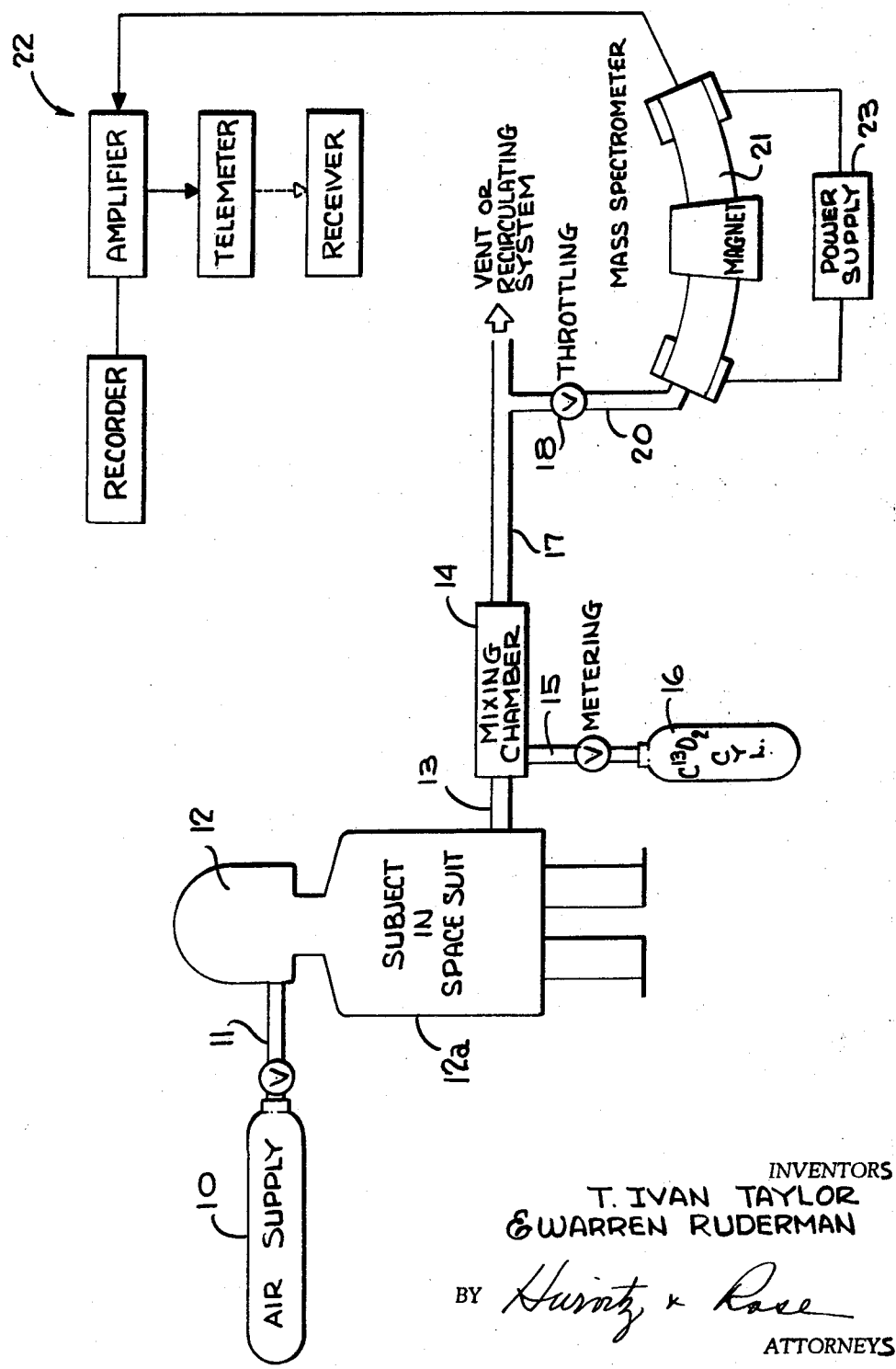

3,396,719
METABOLIC RATE METER AND METHOD
Thomas Ivan Taylor, Leonia, and Irving Warren Ruderman, Demarest, N.J., assignors to Isomet Corporation, Palisades Park, N.J., a corporation of New Jersey
Filed July 2, 1963, Ser. No. 292,340
8 Claims. (Cl. 128—2.07)

This invention relates to a novel method and apparatus for measuring the dynamic metabolic rate of a human or animal. More particularly, the invention concerns a novel method and apparatus for measurement of respiratorially excreted carbon dioxide in relation to isotope labelled carbon dioxide introduced into the respiratorial excretion of a human or animal, by mass spectrometric methods.

The invention described herein was made in the performance of work under a NASA contract and is subject to the provisions of Section 305 of the National Aeronautics and Space Act of 1958, Public Law 85–568 (72 Stat. 435; 42 USC 2457).

One of the known methods of measuring the metabolic rate of a human or animal is the determination of the ratio by volume of oxygen consumption to carbon dioxide production. This requires cumbersome and complicated apparatus, and the procedures involve total mass balances of oxygen and carbon dioxide. One of the requirements for early manned space flight is the necessity of obtaining data on the physiological behavior and metabolic performance of man and animals in the environment of a space vehicle and in a weightless state. For this purpose it is desirable to monitor several parameters, one of which is the metabolic rate, particularly during periods of weightlessness. Environmental control systems, involving the absorption of water and carbon dioxide, and the supply or regeneration of oxygen, require an accurate knowledge of the metabolic rate during weightlessness, since this profoundly affects the design of the vehicle.

The presently available equipment has numerous disadvantages for application to space vehicles, among which are that the equipment is bulky and not readily susceptible to telemetering of information from a space vehicle to a ground station, and that it is difficult to obtain instantaneous metabolic rates and at the same time to detect small changes in the rates with time.

In accordance with the present invention there is provided a novel method and apparatus for the measurement of the metabolic rate at any instant, by employing stable isotope labelled carbon dioxide and the techniques of mass spectrometry.

It has been proposed in the prior art to employ radiation-labelled carbon compounds which are ingested by humans or animals, or which are injected into them, such compounds containing radioactive $C^{14}$. The exhalations of the subject are then collected, partly mixed with fresh air, and the amount of radioactive $C^{14}O_2$ is electronically monitored by means of an ionization chamber or a counter for radioactivity. A system of this type is described in U.S. Patent 3,000,377.

It is known that the application of isotopes to respiration or metabolic rate studies is influenced by the behavior of the isotope molecules of oxygen and carbon dioxide during the respiratory processes. For example, when oxygen$^{18}$ is inspired, the isotope does not appear immediately in the respiratory carbon dioxide, but instead, as reported by Lifson et al., J. Biol. Chem., vol. 180, p. 803 (1949), the oxygen is converted to body water. The expired carbon dioxide equilibrates with the body water and, as the oxygen$^{18}$ content of the body water increases, the concentration of oxygen$^{18}$ in the exhaled carbon dioxide also increases. Thus introducing oxygen$^{18}$ with the air stream inhaled by a subject is not useful for measuring short term variations in the metabolic processes of the subject. However, as reported by N. Lifson et al., J. Appl. Physiol., vol 7, p. 704 (1955), the difference between the fractional turnover rates of deuterium and oxygen$^{18}$ in body water labelled with $D_2O^{18}$ has been found useful for measurement of total $CO_2$ production which reflects energy output. This method is useful in research on metabolism, but its response to changes in metabolic rate is too slow to be useful in studies on space flight.

In accordance with the present invention, it was found that an isotope dilution method was well suited for the measurement of carbon dioxide output by the human or animal body. Among the isotopes which were considered were oxygen$^{18}$, carbon$^{14}$ and carbon$^{13}$. If $CO_2^{18}$ is introduced into the expired air stream there is the possibility of exchange of the oxygen$^{18}$ with the water vapor. This would introduce an error. Carbon$^{14}$ labelled carbon dioxide was discarded as a choice because of the deleterious effects of the radioactive carbon$^{14}$ on humans. The stable isotope carbon$^{13}$ has no harmful physiological effects on humans and is an ideal choice.

Although inhaled $C^{13}O_2$ would mix relatively rapidly with the alveolar $CO_2$ and provide a means of estimating $CO_2$ output, the desirability of avoiding the complication of the small amount that enters the body via exchange with bicarbonate led to the discovery of the isotope dilution method of the invention for measurement of the rate of carbon dioxide output and hence the metabolic rate.

The novel isotope dilution method of carbon dioxide metabolic rate measurement, according to the invention, involves introducing carbon$^{13}$ labelled carbon dioxide into a confined expired air stream at a predetermined rate, mixing the $C^{13}O_2$ with said exhalations, withdrawing a sample of said mixture and measuring the ratio of carbon$^{12}$ to carbon$^{13}$ in said sample by mass spectrometry. By employing dual collection mass spectrometry an instantaneous ratio of carbon$^{12}$ to carbon$^{13}$ is obtained, thereby providing an instantaneous measurement of the generation of carbon dioxide.

The mass spectrometer employed for the analysis of the mixed gases may be of any suitable type, which is adapted for gas analysis, and which continually analyzes, and registers on a recording device, changes in the concentration of $C^{12}O_2$ and $C^{13}O_2$, so that readings may be taken and transmitted by telemetry or other means. A suitable type of mass spectrometer can be one in which a part of the gas stream is passed through the spectrometer tube to enter a conventional ionizing head where the gas is subjected to electron bombardment. The ions which are thus formed are accelerated by means of high voltage, collimated and projected into a magnetic field in which the ions of lighter atomic weight are deflected to a greater extent than those of higher atomic weight, and deposited on separate collector plates, the intensity of ion currents being measured by suitable amplifying and recording devices if a duel collector mass spectrometer is used. Then the $C^{12}O_2$ and $C^{13}O_2$ peaks are recorded simultaneously. In such a case the ratio of $C^{12}$ to $C^{13}$ gives a measure of the instantaneous rate of carbon dioxide generation.

The isotope dilution measuring method of the invention is based upon the following principles. By adding a small stream of isotope labelled $C^{13}O_2$ to a gas stream, such as a stream of respiratorial exhalations, at a known flow of $C^1$ moles per minute, the quantity of $C^{13}$ isotope entering the stream from this source is $C^1Ni$, where $Ni$ is the atom fraction of the carbon which is $C^{13}$. The term "atom fraction" refers to the ratio of the number atoms (or moles) of the isotope of a particular element in the particular gas stream to the total number of atoms (or moles) of that same element. The entering $C^{13}O_2$ is admixed with the carbon dioxide present in the expired air (which also contains nitrogen, water vapor, and some unconsumed oxygen), and the fraction of $C^{13}$ in the carbon dioxide of the mixed gas stream is determined by means of a mass spectrometer. From the resulting data, the quantity of carbon dioxide, i.e. the moles of normal $C^{12}O_2$ flowing per minute in the expired air, can be computed by means of the following equations:

Since the total $C^{13}$ leaving the system must equal the amount of $C^{13}$ entering, the material balance equation is:

$$C^1 Ni + CN = (C^1 + C)Ne \qquad (1)$$

wherein:

C = moles of carbon dioxide flowing per minute in the expired air;
N = atom fraction of $C^{13}$ in the expired carbon dioxide;
$C^1$ = moles of carbon dioxide enriched in $C^{13}$ added to the gas stream per minute;
Ni = atom fraction of $C^{13}$ in the enriched carbon dioxide;
Ne = atom fraction of $C^{13}$ in the carbon dioxide after admixing.

Solving Equation 1 for C, there is obtained the formula:

$$C = C^1 \left( \frac{Ni - Ne}{Ne - N} \right) \qquad (2)$$

The atom fraction of $C^{13}$ in the expired air is known, being essentially that in normal carbon dioxide (N=0.011) and both $C^1$ and Ni are known.

Thus a determination of Ne with a mass spectrometer permits the determination of the moles per minute, C, and hence the volume of expired carbon dioxide produced by the subject per minute can be determined. That is, the mass spectrometer measurement resolves the quantity Ne in Equation 2 for determining C, and is essentially equivalent to a determination of the ratio of $C^{12}$ to $C^{13}$ in the expired air using a dual collector type mass spectrometer. The significant aspect, of course, is a determination of carbon dioxide production per unit time by means of an isotope dilution method and apparatus.

In this way, the novel method of the present invention provides a means of measuring the total quantity of carbon dioxide produced without actually measuring the flow of the expired gases. The value of C thus obtained is expressed in moles of carbon dioxide flowing per minute, and thus is very different from concentration of $CO_2$ as obtained, for example, with an infrared spectrometer. Thus, the isotope dilution method of the invention provides much more useful information with respect to the metabolic rate of the subject and to his expenditure of energy than previously known methods, since the isotope dilution method can be used to determine the quantity of carbon dioxide expired per minute at any instant.

The above and still further objects, features and advantages of the present invention will become more apparent upon consideration of the following detailed description of one specific embodiment thereof, especially when taken in conjunction with the accompanying drawing, wherein:

The single figure depicts a schematic arrangement of the various components of the apparatus of the invention, and also serves as a flow diagram of the steps of the method.

In the drawing, air containing the normal abundance of carbon dioxide from a supply source 10 is supplied to the subject via tube 11 and a respirator mask or helmet, or the like, shown generally at 12. The exhalations flow from the subject through tube 13 to a mixing chamber 14, to which a supply of $C^{13}O_2$ is fed at a controlled rate from a tank 16, via tube 15. The mixed gas stream containing the expired gases, unconsumed oxygen, water vapor and nitrogen, passes via tube 17 to a vent or recirculating system, a portion of the gas stream being supplied, via control valve 18 and tube 20, to a mass spectrometer, shown generally at 21, which may be of any conventional type. If a dual collector type mass spectrometer is used, the readings may be taken thereon instantaneously and continuously. The ratio of carbon$^{12}$ to carbon$^{13}$ in the expired air is thus continuously measured.

The subject may be clothed, for example, in a pressurized space suit, and in the drawing, element 12a is intended to be a general depiction of such a suit.

Auxiliary equipment of any suitable type may be provided for telemetering the ratio of carbon$^{12}$ to carbon$^{13}$, such equipment being shown, in combination, at 22. The mass spectrometer 21 is energized from a power source shown generally at 23.

In the operation of the apparatus, if it be assumed that the rate of carbon dioxide production in a human subject is about 500 cc. per minute, there may be provided, for example, a metered inlet flow of about 10 cc. per minute of $C^{13}O_2$ gas enriched to the extent of about 50 mole percent $C^{13}$. This rate of flow permits the measurement of changes af about 2% in the rate of carbon dioxide production of the subject. Since the concentration of carbon dioxide in expired air is usually between 3% and 6%, this permits of mass spectrometric analysis directly, without the necessity of concentration of the carbon dioxide present in the exhalations.

What is claimed is:

1. Method for the determination of the metabolic rate of humans and animals which comprises the steps of forming a stream of the respiratorial exhalations, introducing carbon$^{13}$ labelled carbon dioxide into said stream at a predetermined rate, uniformly admixing said stream and said labelled carbon dioxide, and measuring the ratio of carbon$^{12}$ to carbon$^{13}$ in said mixture by mass spectrometry.

2. The method of claim 1 in which an instantaneous ratio of carbon$^{12}$ to carbon$^{13}$ is obtained by employing dual collection mass spectrometry, thereby providing an instantaneous measurement of the generation of carbon dioxide.

3. The method of claim 1 in which the ratio of carbon$^{12}$ to carbon$^{13}$ is transmitted to a receiving point by telemetry.

4. Apparatus for the determination of the metabolic rate of humans and animals comprising, in combination, a source of respiratory air, a respiratory means enclosing the subject tested, a source of carbon$^{13}$ labelled carbon dioxide, a mixing chamber for mixing respiratorial exhalations and said labelled carbon dioxide, and a mass spectrometer adapted to measure the ratio of carbon$^{12}$ to carbon$^{13}$ present, and means successively connecting the aforesaid means to transmit air and gases through the system.

5. The apparatus of claim 4 in which the respiratory means is a pressurized space suit.

6. The apparatus of claim 4 which further includes means for telemetrically transmitting the measurements of the mass spectrometer to a receiving point.

7. The method of measuring the carbon dioxide output of the respiratory system of an animal subject, comprising the steps of introducing a metered flow of carbon$^{13}$ labeled carbon dioxide into a confined stream of the respiratorial exhalations of the animal subject to form a mixture thereof, sampling the mixture, and measuring the ratio of carbon$^{13}$ labeled atoms to total carbon atoms in the carbon dioxide of the sample.

8. The method according to claim 7 wherein the step of measuring is performed by mass spectrometry to obtain a continuous measurement of the rate of flow of normal carbon dioxide in the exhalation of the subject.

References Cited

UNITED STATES PATENTS

| | | | |
|---|---|---|---|
| 2,668,471 | 2/1954 | Benziger et al. | 128—208 X |
| 2,776,377 | 1/1957 | Anger | 128—2 X |
| 3,000,377 | 9/1961 | Tolbert et al. | 128—2.07 |

RICHARD A. GAUDET, *Primary Examiner.*

SIMON BRODER, *Assistant Examiner.*